July 31, 1945.  E. W. BOERSTLER  2,380,682
APPARATUS FOR APPLYING RADIANT ENERGY
Filed April 14, 1941  2 Sheets-Sheet 2
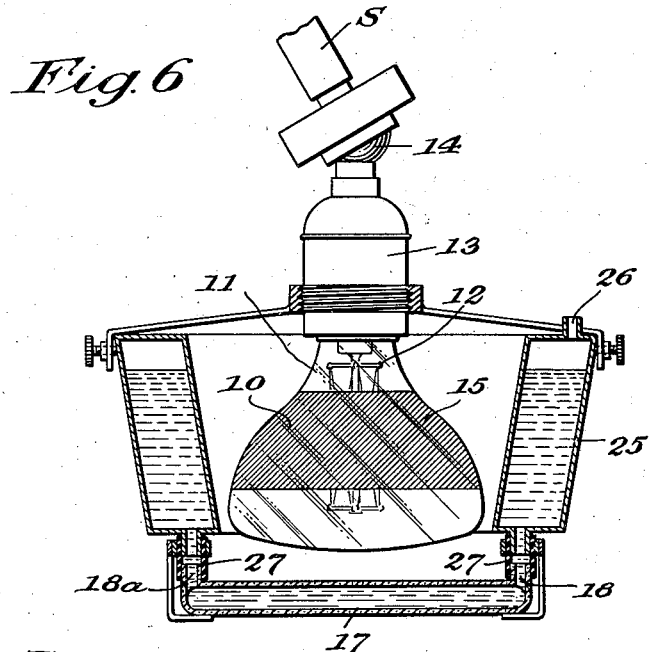
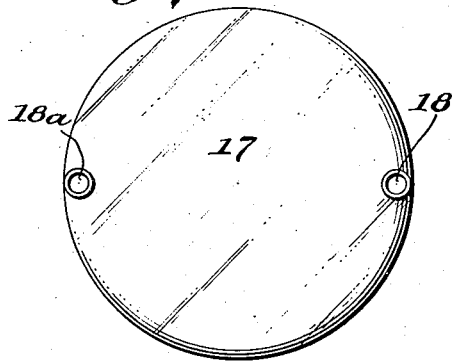
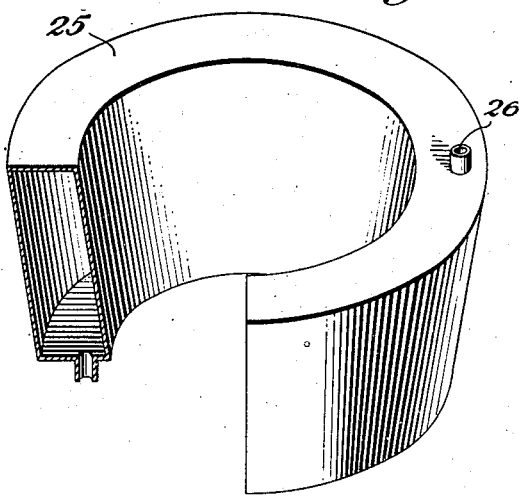
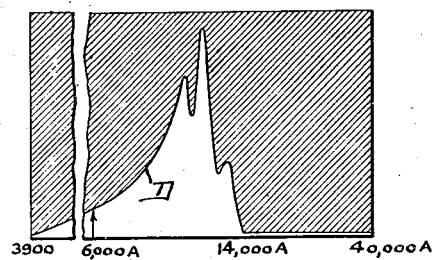
Inventor
Edward W. Boerstler
By Spear, Rawlings & Spear.
Attorneys.

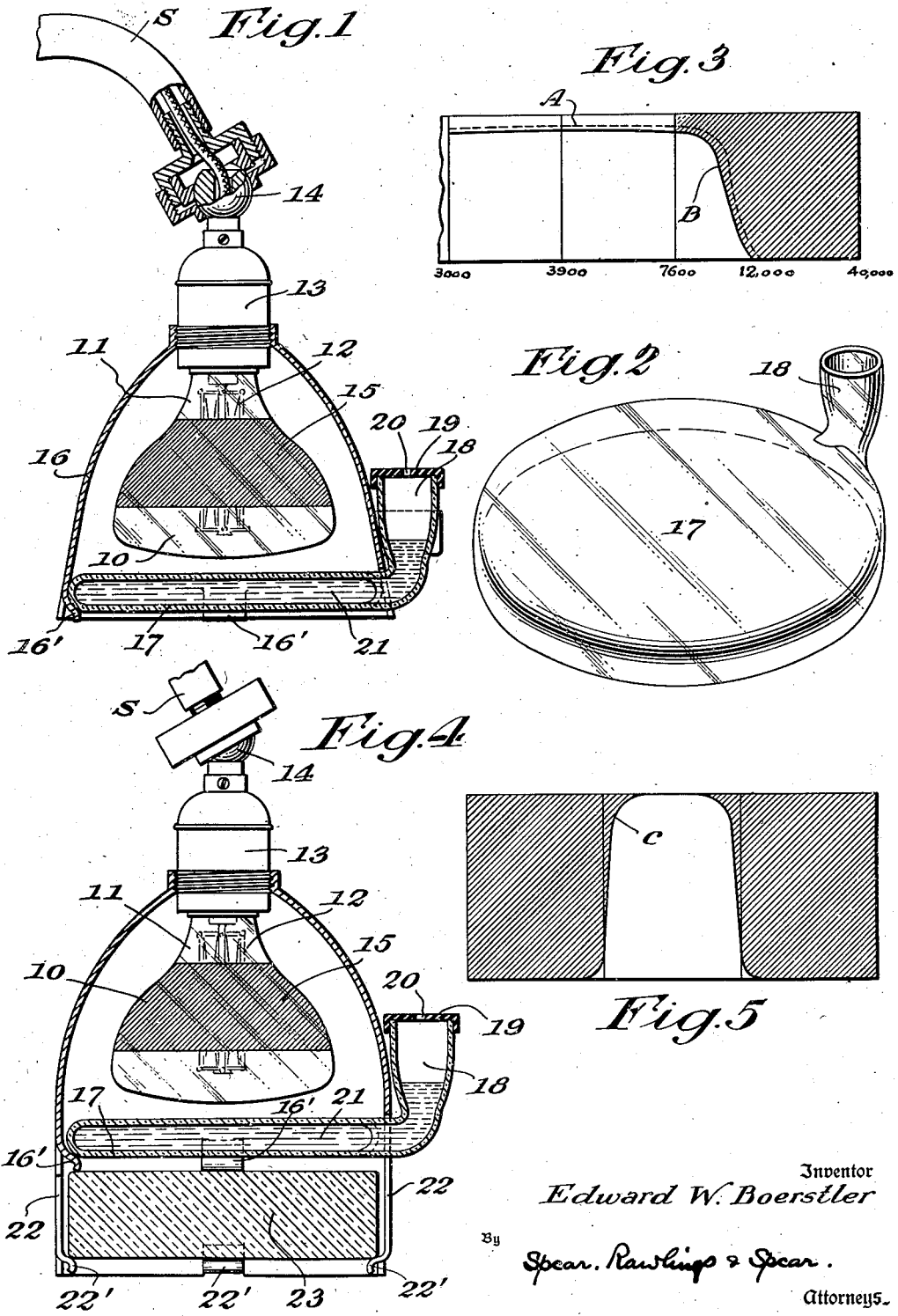

Patented July 31, 1945

2,380,682

UNITED STATES PATENT OFFICE 2,380,682

APPARATUS FOR APPLYING RADIANT ENERGY

Edward W. Boerstler, Watertown, Mass.

Application April 14, 1941, Serial No. 388,361

4 Claims. (Cl. 88—107)

This invention relates to the generation and application of radiant energy of solar or super-solar intensity. My main objectives are: first, a beam including both the visible and ultra-violet radiations from which the objectionable heat or long wave infra-red radiations have been removed; second, a beam of pure visible radiations from which the ultra-violet as well as the short wave infra-red radiations have been removed; third, the filtering of the heat from the generated beam without a forced circulation water system; and, fourth, the delivery of the filtered radiations to the objective regardless of its angular position.

The therapeutic value of the combined ultra-violet and visible radiations is well known. However, there are cases where prolonged use of the ultra-violet may cause irritation, in which cases treatment with the visible radiations alone may be profitably continued as pure visible radiation has definite physiological value.

Such visible radiations are sometimes known as "cold light," and are of value in the projection of motion pictures and television, both of which arts require great intensities of light with a minimum of heat, as well as in commercial displays where the articles or materials are injured by heat.

The conventional generator of high radiant energy is cooled by water under forced circulation. Water, as is well known, is an excellent filter for heat as well as an excellent transmitter of the visible and ultra-violet radiations. However, because of its low boiling point and the extreme intensity of the radiations, it has been considered impossible to use non-circulating water in close proximity to the generator; and it has therefore been the practice to employ forced circulation which involved expensive accessory cooling apparatus, such as radiators, fans and pumps.

My present invention contemplates the use as filter mediums not only of liquids having such high boiling points that they may be positioned closely adjacent the generator, but also the use of water without forced circulation or other accessory cooling even when as much as three gram calories per square centimeter per minute of energy is applied without a temperature rise in the water above 140° F. in continuous operation.

My filter materials are contained in a novel filter cell which forms part of my present invention. This is a substantially flat cellular body of sufficient extent to span substantially the entire width of the generated beam. This cell is mounted in close juxtaposition to the generator, and, preferably, is supported by the same means that adjustably supports the generator, so that as the generator is adjusted to throw its beams at any desired angle, the filter cell is similarly adjusted to intercept and remove the undesired rays from the beam.

The filter cell contains a suitable filtering medium, and, in order that the cell may be completely filled at all times regardless of the angle at which it may be held, I provide an expansion chamber communicating with the filter cell and extending angularly above the level of the liquid in the completely filled cell at a point outside of the path of the radiations. To assure that the liquid will at all times completely fill the cell regardless of the angle at which it is held, the surface level of the filtering liquid is maintained in the expansion chamber at a point above the top of the filter cell. This expansion chamber is vented and may likewise constitute the filling opening of the cell.

For the filter I may use a liquid which has a substantially higher boiling point than water, preferably a boiling point of 300° F. or higher so that the filter cell may be placed reasonably close to the generator in order to have a compact and small apparatus. Such a liquid need not be circulated but it must be water-clear so as to transmit the visible as well as the ultra-violet portion of the spectrum, while being capable also of removing the unwanted long wave infra-red heat rays from the generated beam. It must be of low volatility in the presence of the intense heat to which it is subjected so as not to give off inflammable vapors, and must not evaporate too quickly.

Examples of filters which admirably fulfill the above requirements are liquids of the class of glycerol $(C_3H_5(OH)_3)$ with a boiling point of approximately 554° F., and ethylene glycol $(HOCH_2CH_2OH)$ with a boiling point of 386.6° F. However, other liquids of relatively high boiling point which have the required spectral transmission and ray filtering qualities may be used, particularly those exhibiting an hydrocarbon radical in combination with one or more hydroxyl groups.

The depth of the filter liquid will depend somewhat upon the nature of the liquid used. In general, a depth of 3 cm. has been found satisfactory for most uses.

The above named filter mediums will remove from a high energy radiation of full spectral range substantially all of the undesirable long wave infra-red radiations of wave lengths of approximately from 1200 A. to 40,000 A., and will transmit without substantial diminution of their intensity the ultra-violet radiations of wave lengths of approximately 3000 A. to 3900 A., as well as the full spectral range of visible radiations of wave lengths of approximately from 3900 to 7600 A. The infra-red rays of wave lengths of from 7600 A. to 12,000 A. is also transmitted.

However, as indicated above, my invention also contemplates the production and application of a band of pure visible radiations. I therefore provide means for filtering the ultra-violet and the remaining infra-red rays from the beam, while transmitting the full spectrum of visible rays to the patient or other objective.

Preferably I provide this second filter as an attachment capable of use with a generator already equipped with the liquid filter described above.

This second filter may conveniently be a solid, and I have used successfully a transparent organic plastic, such as methyl methacrylate or an equivalent polymerized synthetic resin of acrylic type. "Lucite" is an example of such material, but other light transmitting resins which have the aforesaid filtering and transmitting properties may be used, as for example, urea formaldehyde, cellulose acetate, or cellulose nitrate.

Structurally, such solid filter unit is substantially coextensive with the liquid filter cell. Its depth may vary, however, as conditions may require. Where additional filtering action as to infra-red rays only is required, such solid unit may be relatively thin, say approximately only three inches. Where complete or substantially complete removal of the ultra-violet is also wanted, it may be as deep as five inches.

While the specific examples of ultra-violet and short-wave infra-red filters which I have named have been solids, it will be understood that any equivalent liquid filter contained within a light-transparent filter cell will be equally satisfactory.

By interposing the liquid filter unit for the heat rays between the solid filter unit for the ultra-violet and the generator, disintegration of the acrylic resin under the intense generated heat is prevented, for by the time the beam reaches the acrylic resin substantially all of the long wave infra-red radiations will have been removed by the liquid filter.

One advantage of this is that the solid filter remains at substantially atmospheric temperature even during long treatment periods despite the fact that the liquid filtering medium soon reaches such a high temperature as to preclude direct application of the filter cell to a patient's body in clinical treatments, or in proximity to the target in industrial uses.

Where the solid filter is used, the applicating end thereof may be applied on the treatment area without discomfort to the patient, and under sufficient pressure to secure substantial dehematisation of the field, thus permitting deeper penetration of the radiations into sub-cutaneous tissue.

Another advantage is that because the solid filter acts as a refrigerant on the sensory nerves, a higher intensity of radiation may be comfortably applied to the patient than would otherwise be the case, for although the visible portion only of the spectrum is being transmitted, nevertheless such rays, if sufficiently intense or sufficently long continued, can produce an unbearable sensation of heat.

By properly relating the thickness of the solid filter unit to the depth of liquid in the filter cell, substantially all of both the infra-red and ultra-violet rays may be removed from the beam, while as high as 92% of the generated visible rays may be delivered to the patient. For example, I have successfully filtered from the generated beam substantially all of the long-wave infra-red with a liquid filter of three centimeters depth, and have removed from such filtered beam the short-wave infra red and the ultra-violet with a plastic filter of five inches thickness.

As indicated above, my invention also contemplates the use of water as a filter for the long-wave infra-red radiations, and includes means for maintaining such water in circulation without the expensive complicated forced-circulation apparatus now on the market. When it is desired to use water as the filter, I provide a reservoir for the filter water by extending the expansion chamber which communicates with the filter cell and into which the filter liquid rises, to completely or substantially surround the generator as a water jacket. This reservoir is maintained nearly full of water at all times, allowing only room for normal expansion under heat, and this water is kept in circulation by the currents created by the heat which is removed from the beam as it intercepts the water in the filter cell. Preferably, this reservoir is made of heat-radiating material such as copper or aluminum, and is connected to the filter cell by lengths of rubber or metal tubing which takes care of the differences in expansion of the metal of the reservoir and the glass of the filter cell under heat.

Although my water-filled filter cell is mounted close to the generator, the constant circulation of the water in the reservoir maintains a temperature of approximately 129° F. for long periods of time. Therefore liquids of low boiling points as water may be used substantially as effectively as the liquids of higher boiling points, it being only necessary to provide a reservoir for a sufficient body of water to carry the heat currents up over the heat radiating surface of the reservoir so that much of the generated heat is given off into the air.

In the accompanying drawings:

Fig. 1 is an elevation, partly in section, of a generator of high radiant energy of conventional type equipped with a liquid filter unit in accordance with my invention.

Fig. 2 is a perspective of the filter unit.

Fig. 3 is a spectrograph showing by curve line A the filtering action on the generated beam when glycerol is used as the liquid filtering medium, and by curve line B the action when ethylene glycol is used.

Fig. 4 is a view similar to Fig. 1 but showing a solid filter unit attached to the generator beyond the liquid filter unit.

Fig. 5 is a view similar to Fig. 3 but showing by curve line C the filtering action on the beam of the combined filters illustrated in Fig. 4.

Fig. 6 is a modified filter unit combined with a generator as shown in Figs. 1 and 4.

Fig. 7 is a top plan view of the filter unit.

Fig. 8 is a fragmentary perspective of the reservoir, and

Fig. 9 is a view similar to Figs. 3 and 5 but showing by curve line D the filtering action on the beam when water is used as the filtering medium.

I have indicated generally at 10, Figs. 1, 4 and 6, a generator of high radiant energy. This is shown as a superheated tungsten filament lamp, but other conventional generators as the carbon arc or mercury vapor lamp may be employed. I prefer the tungsten filament lamp however because its spectrum is more nearly continuous in the ultra-violet and visible regions.

Such lamp includes a tungsten filament 12 within the usual glass envelope 11. The socket 13 connects the lamp into an electric circuit. As shown, the socket is swivelly connected as at 14 to the support S. Preferably the glass envelope 11 is coated with suitable reflecting material 15 to direct all the generated rays downwardly, but if desired an external reflector may be substituted.

The generator 10 may be provided with a housing 16 having spring members 16' to attach to the housing my novel filter unit for removing from the beam the long-wave infra-red rays. This filter includes a substantially flat cell 17 disposed across the open mouth of the housing at right angles to the path of the generated beam, and provided, preferably at one side of the housing 16 outside of the path of the beam, with an angularly upwardly extending portion constituting an expansion chamber 18 which is closed by a detachable cap 19 having a vent opening 20 therein. The expansion chamber may be molded integrally with the cell, the walls of the cell being extended upwardly and outwardly to form the expansion chamber.

The cell 17 is of a size substantially to span the entire width of the beam and of a depth to contain a sufficient volume of liquid, for example 3 cm. to remove from the beam the long wave infra-red rays.

The cell 17 is made of transparent or water-clear material of high heat resistance, as borosilicate glass, and is preferably filled with a high boiling point liquid 21, such as glycerol or ethylene glycol.

Outwardly of the cell 17, I dispose a second filter 23 for removing from the beam the ultra-violet and remaining infra-red rays. Where desired, I may extend the housing 16 beyond the cell 17 as at 22 and provide it with means 22' to grip the filter 23 which preferably is a solid body. The solid may be an organic plastic, as methyl methacrylate, or "Lucite," or equivalent acrylic resin. It is of a size to span substantially the full beam passing through the cell 17 and of suitable thickness to remove the unwanted rays from the beam without materially impeding the passage of the visible portion of the spectrum therethrough. As indicated above, the thickness of this plastic filter may vary from three to five inches depending on whether it is desired to filter only the short-wave infra red rays from the beam, or also to filter the ultraviolet.

The filtering effects secured by the devices shown in Figs. 1 to 4 are graphically illustrated in Figs. 3 and 5.

Referring to Fig. 3, that portion of the spectrum generally removed by the liquid filter 17 is represented by curve A when the liquid is glycerol, and by curve B when it is ethylene glycol.

As indicated above, my invention also provides for water as the filtering medium for the long-wave infra-red radiations, and includes means for maintaining such water in constant circulation during use so as to dissipate much of the generated heat removed from the beam by the filter water without the expensive and complicated forced-circulation apparatus now employed for this purpose.

Suitable means for this purpose are illustrated in Figs. 6-9. I provide a reservoir 25 for the filter water by extending the expansion chambers 18—18a which communicate with the filter cell 17 shown in Figs. 1 and 2, and into which the filter liquid rises, to form a water jacket completely surrounding the generator, and which is suitably vented as at 26.

While my invention includes a reservoir molded integrally with the filter cell from suitable material, nevertheless in view of the difficulty and expense connected with the production of such a vessel, and also because of the greater heat reflecting properties of metals such as copper or aluminum, I preferably form the filter cell 17 and reservoir 25 as separate members and connect these through the chambers 18—18a of Fig. 7 by means of pieces of rubber or metal tubing 27 of suitable size. This tubing satisfactorily takes care of the differences in expansion and contraction of the glass of the filter 17 and metal of the reservoir 25.

The reservoir 25 is maintained nearly full of water, allowing only room for normal expansion under heat, and this water is kept in circulation by convection currents generated by the heat removed from the beam of radiations by the water in the filter cell.

Preferably the reservoir 25 is made of heat-radiating material as copper or aluminum, and the constant circulation of the water over the surfaces of the reservoir maintains the temperature of the water at approximately 129° F. for long periods of time.

Thus, according to my invention, liquids of relatively low boiling points, as water, may be used substantially as effectively as the liquids of higher boiling points, the difference being only that in the case of water the filter cell must communicate with a reservoir for a sufficient body of liquid to carry off the objectionable heat currents.

By the simple means above described, I am able to administer both ultra-violet and visible radiations at any angle desired and also to avoid any necessity for the expensive auxiliary water cooling systems which have represented by far the greater part of the prohibitively high cost of the machines now commercially available.

What I therefore claim and desire to secure by Letters Patent is:

1. A filter system for use with an incandescent lamp projecting a beam of solar or super-solar intensity, comprising a pair of filters which are substantially coextensive in area, and means for supporting said filters in operative relation to the lamp and in positions substantially parallel to each other and substantially at right angles to the axis of the beam, one of said filters consisting of a body of methyl methacrylate resin of a thickness in the order of approximately from three to five inches for removing from the beam ultra-violet radiations and infra-red radiations of wave lengths approximately from 7600 A. U. to 12,000 A. U. while transmitting the visible radiations to the patient or target, and the other filter consisting of a cell containing a liquid filtering medium arranged between the resin filter and the emitting end of the lamp for removing from the beam radiations of wave lengths of approximately 12,000 A. U. and longer which would destructively affect the resin filter.

2. The filter system of claim 1 in which the liquid filtering medium is a liquid of the class consisting of glycerol and ethylene glycol.

3. The filter system of claim 1 in which the depth of the liquid filtering medium is approximately three centimeters.

4. The filter system of claim 1 in which the liquid filtering medium is a liquid of the class consisting of glycerol and ethylene glycol and has a depth of approximately three centimeters.

EDWARD W. BOERSTLER.